United States Patent
Jeansonne et al.

(12)

(10) Patent No.: US 6,881,098 B2
(45) Date of Patent: Apr. 19, 2005

(54) SYSTEM AND METHOD FOR SELECTIVELY COMMUNICATIVELY COUPLING AND TRANSMITTING POWER BETWEEN AN ELECTRONIC DEVICE AND A PERIPHERAL COMPONENT

(75) Inventors: Jeffrey K. Jeansonne, Houston, TX (US); Earl W. Moore, Cypress, TX (US); Tim L. Zhang, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/413,075

(22) Filed: Apr. 14, 2003

(65) Prior Publication Data

US 2004/0203275 A1 Oct. 14, 2004

(51) Int. Cl.⁷ .................... H01R 11/00; H01R 25/00; H01R 27/02; H01R 31/00; H01R 33/88
(52) U.S. Cl. .................... 439/638; 439/502
(58) Field of Search .................... 439/378, 638, 439/502

(56) References Cited

U.S. PATENT DOCUMENTS

| | | | |
|---|---|---|---|
| 5,884,086 A | 3/1999 | Amoni et al. | |
| 5,958,020 A | 9/1999 | Evoy et al. | |
| 6,095,837 A | * 8/2000 | David et al. | 439/188 |
| 6,210,216 B1 | 4/2001 | Tso-Chin et al. | |
| 6,211,649 B1 | 4/2001 | Matsuda | |
| 6,283,789 B1 | * 9/2001 | Tsai | 439/502 |
| 6,407,914 B1 | 6/2002 | Helot | |
| 6,415,342 B1 | 7/2002 | Wahl et al. | |
| 6,465,987 B1 | 10/2002 | Haas et al. | |

\* cited by examiner

*Primary Examiner*—Chandrika Prasad

(57) ABSTRACT

A system comprises an electronic device, a peripheral component and a cable. The cable couples the peripheral component to the electronic device. The cable further comprises a connector end for connection to a standard port on the electronic device. The connector end has an abutment feature designed to prevent engagement of the connector end with certain ports.

30 Claims, 4 Drawing Sheets

SYSTEM AND METHOD FOR SELECTIVELY COMMUNICATIVELY COUPLING AND TRANSMITTING POWER BETWEEN AN ELECTRONIC DEVICE AND A PERIPHERAL COMPONENT

BACKGROUND

A variety of peripheral components are coupled to electronic devices, such as computers. For example, many computers now comprise at least one universal serial bus (USB) port through which peripheral devices may be connected to the computer. For example, USB cables can be used to connect printers, scanners, mice, joysticks, web cams, modems, speakers, telephones and many other devices to an electronic device for interaction with the device. The USB port is an input/output port that may be coupled to a USB cable having two wires for power (+5 volts and ground) and a twisted pair of wires for carrying data. Based on the USB standard, 0.5 amps are available at five volts (2.5 watts) at the USB port. Thus, the USB standard enables the powering of a variety of low-power devices directly through device USB ports.

However, for high-power devices, such as mass storage devices, insufficient power is available at a USB port constructed according to the basic requirements of the USB specification. Accordingly, such devices are powered by an external power supply. If such a high-power device is not powered by an external power supply and is coupled to a USB port having insufficient power available, detrimental results can occur. For example, the peripheral device may not function properly, or the power draw of the peripheral device can trigger an automatic shut down of the USB port or overall electrical device.

SUMMARY

In one embodiment of the present invention, an apparatus is provided for coupling a peripheral component to a device via a universal serial bus port. The apparatus comprises a cable having a first connector end and a second connector end. The first connector end comprises a series A USB connector and an abutment adjacent the series A USB connector.

According to another embodiment, a system comprises an electronic device having a powered USB port and a device connection feature. The powered USB port is designed to have more than USB standard power available. The system also comprises a peripheral component having power requirements greater than the USB standard. A USB cable is able to couple the peripheral component and the electronic device. The USB cable has a connector end with a USB connector and a corresponding connection feature that cooperates with the device connection feature on the electronic device to permit insertion of the USB connector into the powered USB port.

According to another embodiment, a method comprises providing an electronic device with a standard input/output port and supplying power to the standard input/output port at a higher level than required by a standard port specification. The method further comprises coupling a powered peripheral component to the electronic device via a connector that blocks coupling to other similar standard input/output ports without power supplied at the higher level.

BRIEF DESCRIPTION OF THE DRAWINGS

Certain embodiments of the invention will hereafter be described with reference to the accompanying drawings, wherein like reference numerals denote like elements, and.

DETAILED DESCRIPTION

Figure 1:
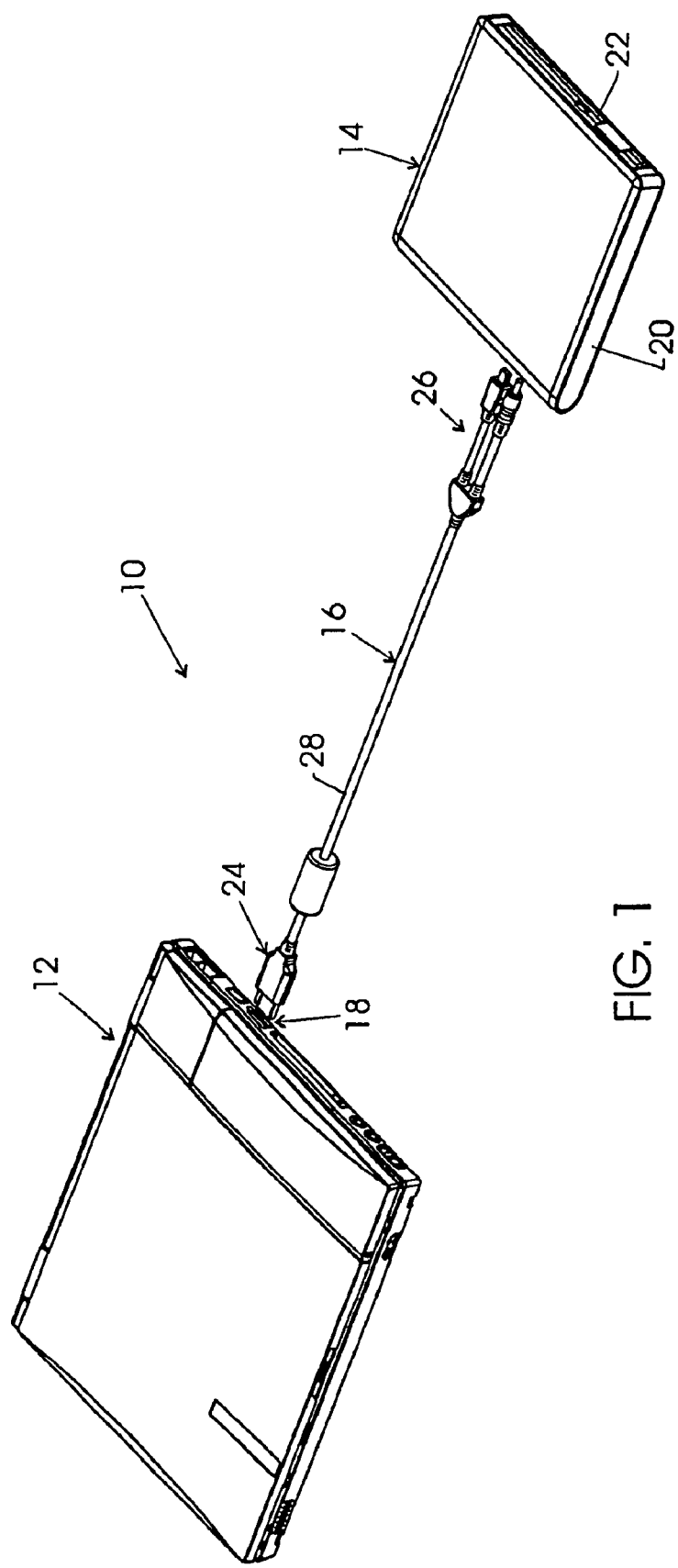
FIG. 1 is a perspective view of an embodiment of a communication system, according to an embodiment of the present invention.

Referring generally to FIG. 1, a system 10 is illustrated according to an embodiment of the present invention. System 10 comprises an electronic device 12 coupled to a peripheral component 14. The electronic device 12 and peripheral component 14 may be coupled to each other by a cable 16. Cable 16 is able to relay data between electronic device 12 and peripheral component 14 and is able to supply power from electronic device 12 to peripheral component 14.

Electronic device 12 may comprise a variety of electronic devices, such as servers, desktop computers and portable computers, e.g., the notebook computer illustrated in FIG. 1. The overall design and the features of a given electronic device 12 will vary depending on the specific type and application of the device.

Electronic device 12 also comprises at least one input/output port 18 able to supply power to peripheral component 14. Input/output port 18 is a standardized port, such as a universal serial bus (USB) port. However, a greater amount of power has been made available to input/output port 18 than required by the port standard specification. For example, if input/output port 18 comprises a USB port providing at least 2.5 amps of available power, the actual power supplied to input/output port 18 of electronic device 12 has been increased to permit the connection of peripheral components 14 having higher power requirements. For example, the power supplied to input/output port 18 may be increased from a normal 2.5 watts to approximately 10 watts, depending on the power requirements of a given peripheral component or components 14 that may be coupled to electronic device 12.

Peripheral component 14 is representative of a variety of high power devices, such as external mass storage devices, e.g. floppy drives, optical drives or hard drives. However, peripheral component 14 may comprise other types of devices as well. In the specific embodiment illustrated, peripheral component 14 comprises an external multibay 20 having a removable mass storage device 22.

Cable 16 may comprise a first connector end 24 coupled to a corresponding or second connector end 26 by a flexible cable portion 28. In this embodiment, connector end 24 is designed for coupling with input/output port 18, and connector end 26 is designed for connection to peripheral component 14. Second connector end 26 may be wired directly to peripheral component 14, or it may be designed for selective coupling with peripheral component 14.

Figure 2:
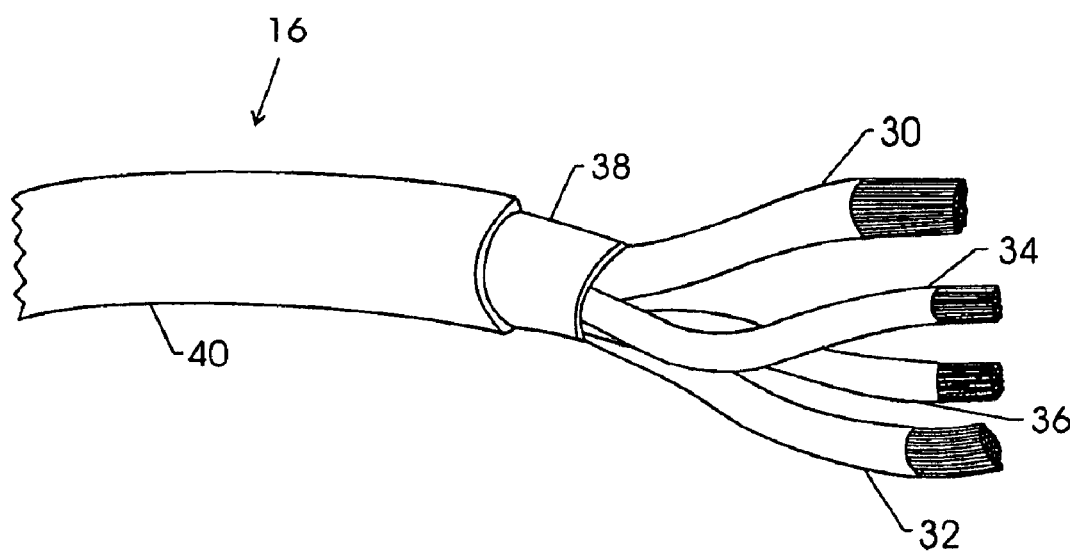
FIG. 2 is a perspective view of a section of USB cable, according to an embodiment of the present invention.

With additional reference to FIG. 2, one example of cable 16 is illustrated as a USB cable. An embodiment of a USB cable may comprise two wires for power, e.g. a +5 volt wire 30 and a ground wire 32. Additionally, the USB cable may comprise a pair of data carrying wires 34, 36 arranged as a twisted pair. Furthermore, the USB cable may comprise a shielding layer 38 and an outer protective layer 40.

Figure 3:
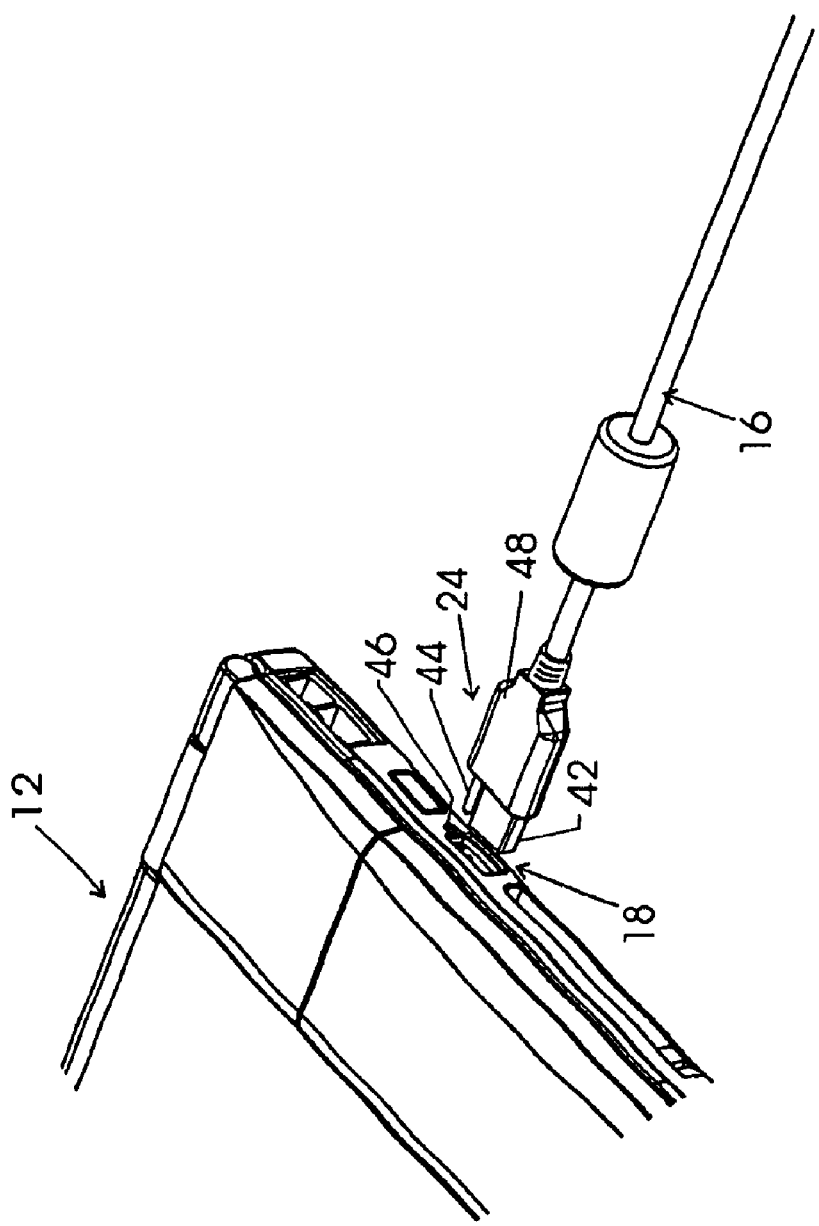
FIG. 3 is a perspective view of a cable connector end and corresponding electronic device according to an embodiment of the present invention.

In the embodiment illustrated in FIG. 3, first connector end 24 forms part of a USB cable 16 and is designed for engagement with input/output port 18, e.g. a USB port having increased power available relative to the power required by the USB standard specification. In this embodiment, connector end 24 comprises a series A USB connector 42 and an abutment 44. Abutment 44 is positioned to prevent insertion of the series A USB connector 42 into a USB port with insufficient power to meet the requirements of peripheral component 14. In other words, if the input/output port on electronic device 12 has not been designed with sufficient power to meet the requirements of peripheral component 14, a user will not be able to engage connector end 24 due to abutment 44.

In the illustrated embodiment, abutment 44 comprises a post disposed adjacent the series A USB connector 42. The abutment 44 is positioned for engagement with a corresponding feature 46 disposed, for example, on electronic device 12 to enable insertion of the series A USB connector 42 into input/output port 18. If abutment 44 is formed as the illustrated post, corresponding feature 46 may be formed as a recess or other opening sized to receive abutment 44. Corresponding feature 46 effectively indicates that input/output port 18 has been designed to supply sufficient power for a given high power device, such as a mass storage drive. By way of example, both series A USB connector 42 and abutment 44 may be arranged to extend from a cable overmold 48 an approximately equal distance.

Figure 4:
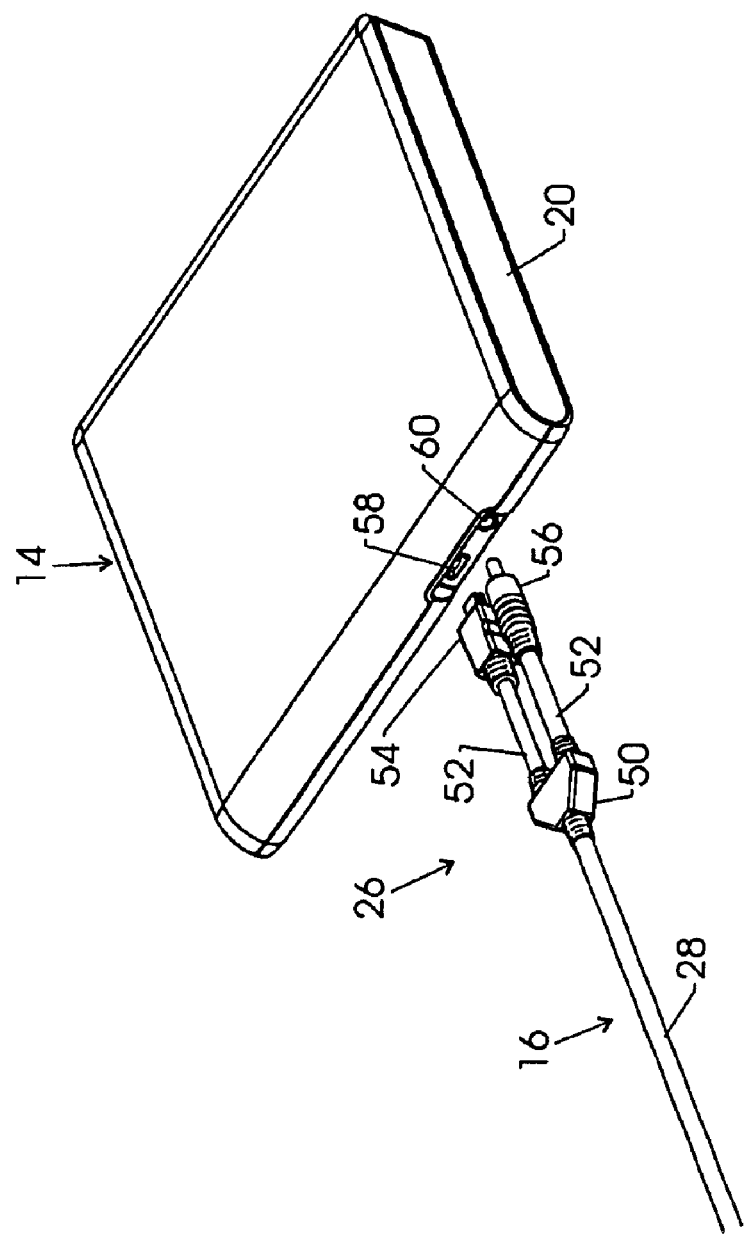
FIG. 4 is a perspective view of a cable end and a corresponding peripheral component according to an embodiment of the present invention.

Cable 16 may be directly wired to peripheral component 14 at second connector end 26. Alternatively and as illustrated in FIG. 4, connector end 26 may be designed to enable a user to selectively connect and disconnect end 26. Additionally, connector end 26 may be formed as a Y connector 50 in which at least two cable sections 52 are split from the main flexible cable portion 28.

In the embodiment illustrated in FIG. 4, cable 16 comprises a USB cable, and cable sections 52 extend to a series B USB connector 54 and a separate power connector 56. Thus, data may be transferred through the series B USB connector 54, and power may be transferred to peripheral component 14 via power connector 56. The series B USB connector 54 and power connector 56 are received in corresponding ports 58 and 60, respectively. Ports 58 and 60 are formed in peripheral component 14 at an appropriate location, such as the rear location illustrated in FIG. 4. Although power connector 56 may be constructed in a variety of forms, the embodiment illustrated comprises a barrel-type connector. By using a separate power connector 56, power can be supplied to peripheral component 14 from a separate source if, for example, the power available at a given USB port is insufficient to power the device.

System 10 enables standard connectors, such as standard USB connectors to be used on electronic devices, such as notebook computers, to support peripheral devices with higher power requirements. Thus, all necessary power for a variety of devices with greater power requirements can be supplied through a single standard connector. The abutment 44, however, prevents a user from attempting to draw excess power from non-high power standardized port, e.g. a USB port with power no greater than required by the USB standard specification. Additionally, compliance with, for example, the USB host specification is maintained by allowing a standard USB device to be used in the USB high power port. In other words, USB devices having low power requirements also can be used in the high power port. The overall design provides an open solution by which a variety of mass storage drives and other devices can be utilized with a standard port, such as a standard USB port, regardless of power requirements.

It should be understood that the foregoing description is of embodiments of the invention, and that the invention is not limited to the specific forms shown. For example, a variety of electronic devices and peripheral components can be used; the cable can take a variety of forms and configurations; the design of the connectors may vary; and the abutment and corresponding features can be changed to accommodate various design parameters.

What is claimed is:

1. An apparatus for coupling a peripheral component to a device via a universal serial bus (USB) port, comprising:
    a cable having a first connector end and a second connector end, the first connector end comprising a series A USB connector and an abutment adjacent the series A USB connector, wherein the series A USB connector is adapted to couple to a USB port having higher power than USB standard, wherein the abutment is adapted to prevent coupling the series A USB connector to a standard USB port having standard power.

2. The apparatus as recited in claim 1, wherein the second connector end comprises a series B USB connector.

3. The apparatus as recited in claim 1, wherein the second connector end comprises a series B USB connector and a separate power connector.

4. The apparatus as recited in claim 3, wherein the separate power connector comprises a barrel connector.

5. The apparatus as recited in claim 1, wherein the abutment comprises a post.

6. The apparatus as recited in claim 1, wherein the first connector end comprises an overmold from which the series A USB connector and the abutment extend an approximately equal distance.

7. A system, comprising:
    an electronic device comprising a powered USB port and a device connection feature, the powered USB port having more than USB standard power available;
    a peripheral component having power requirements greater than the USB standard; and
    a USB cable to couple the peripheral component and the electronic device, the USB cable having a connector end with a USB connector and a corresponding connection feature that cooperates with the device connection feature to enable insertion of the USB connector into the powered USB port, and to prevent insertion of the USB connector into a standard USB port.

8. The system as recited in claim 7, wherein the electronic device comprises a portable computer.

9. The system as recited in claim 7, wherein the peripheral component comprises an external multibay.

10. The system as recited in claim 7, wherein the peripheral component comprises a mass storage device.

11. The system as recited in claim 7, wherein the peripheral component comprises an optical drive.

12. The system as recited in claim 7, wherein the peripheral component comprises a hard drive.

13. The system as recited in claim 7, wherein the corresponding connection feature comprises a post and the device connection feature comprises an opening sized to receive the post.

14. The system as recited in claim 7, wherein the USB cable comprises a second end having a series B USB connector and a separate power connector.

15. A method, comprising:
    providing an electronic device with a standard input/output port;

supplying power to the standard input/output port at a higher level than required by a port standard; and coupling a peripheral component to the electronic device via a connector that blocks coupling to other similar standard input/output ports without power supplied at the higher level.

16. The method as recited in claim 15, wherein providing comprises forming the standard input/output port as a USB port.

17. The method as recited in claim 15, wherein providing comprises providing a portable computer.

18. The method as recited in claim 15, wherein coupling comprises connecting the peripheral component to the electronic device via a cable having the connector.

19. The method as recited in claim 15, further comprising forming the connector with a series A USB connector and an abutment.

20. The method as recited in claim 15, further comprising forming the connector with a series A USB connector and an adjacent post extending from an overmold.

21. The method as recited in claim 15, wherein coupling comprises coupling a mass storage device to the electronic device.

22. The method as recited in claim 15, wherein coupling comprises coupling an external multibay to the electronic device.

23. A system, comprising:
means for connecting a peripheral component to a USB port of an electronic device; and
means for preventing such connection to any USB port having insufficient power available to power the peripheral component.

24. The system as recited in claim 23, wherein the means for connecting comprises a USB cable.

25. The system as recited in claim 23, wherein the means for preventing comprises an abutment post.

26. An electronic device, comprising:
an input/output port having higher power than a standard power for the input/output port, wherein the input/output port is adapted to couple with an input/output connector; and
a first connection feature adjacent the input/output port, wherein the first connection feature is adapted to cooperate with a second connection feature adjacent the input/output connector to facilitate coupling of the input/output connector with the input/output port, such that the input/output connector is prevented from coupling to an input/output port having a standard power.

27. The electronic device of claim 26, wherein the input/output port is a USB port, the input/output connector is a USB connector, and the standard power is standard USB power.

28. The electronic device of claim 26, wherein the first connection feature is a receptacle adapted to receive the second connection feature, wherein the second connection feature is a post.

29. The electronic device of claim 26, wherein the first connection feature is a post adapted for insertion into the second connection feature, wherein the second connection feature is an opening.

30. The electronic device of claim 26, wherein the electronic device is a portable computer.

* * * * *